United States Patent
Ariyoshi et al.

(10) Patent No.: US 9,707,860 B2
(45) Date of Patent: Jul. 18, 2017

(54) VEHICLE CONTROL DEVICE AND VEHICLE CONTROL METHOD

(71) Applicant: Nissan Motor Co., Ltd., Kanagawa (JP)

(72) Inventors: Tomohiro Ariyoshi, Kanagawa (JP); Takahiro Yoshino, Kanagawa (JP); Masashi Ono, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 0 days.

(21) Appl. No.: 14/909,887

(22) PCT Filed: Jul. 3, 2014

(86) PCT No.: PCT/JP2014/067847
§ 371 (c)(1),
(2) Date: Feb. 3, 2016

(87) PCT Pub. No.: WO2015/019766
PCT Pub. Date: Feb. 12, 2015

(65) Prior Publication Data
US 2016/0185254 A1    Jun. 30, 2016

(30) Foreign Application Priority Data

Aug. 5, 2013    (JP) .................................. 2013-162457

(51) Int. Cl.
| | | |
|---|---|---|
| *B60L 15/20* | (2006.01) | |
| *B60K 6/48* | (2007.10) | |
| *B60L 7/06* | (2006.01) | |
| *B60L 7/08* | (2006.01) | |
| *B60W 10/184* | (2012.01) | |
| *B60W 30/18* | (2012.01) | |

(Continued)

(52) U.S. Cl.
CPC ............ *B60L 15/2018* (2013.01); *B60K 6/48* (2013.01); *B60L 7/06* (2013.01); *B60L 7/08* (2013.01);

(Continued)

(58) Field of Classification Search
CPC ..... B60K 6/48; B60L 7/06; B60L 7/08; B60L 7/26; B60L 11/14; B60L 15/2018;

(Continued)

(56) References Cited

U.S. PATENT DOCUMENTS

| | | | | |
|---|---|---|---|---|
| 4,497,395 A | * | 2/1985 | Nogami | .................... B60T 7/04 180/273 |
| 5,916,058 A | * | 6/1999 | Sakai | ...................... F16H 61/20 477/114 |

(Continued)

FOREIGN PATENT DOCUMENTS

| | | |
|---|---|---|
| JP | 2000009157 A | 1/2000 |
| JP | 2002-142310 A | 5/2002 |

(Continued)

OTHER PUBLICATIONS

International Preliminary Report on Patentability issued in corresponding Application No. PCT/JP2014/067847, mailed on Feb. 11, 2016 (11 pages).

*Primary Examiner* — Atul Trivedi
(74) *Attorney, Agent, or Firm* — Osha Liang LLP

(57) ABSTRACT

A vehicle control device includes a drive source controller configured to control a drive source on the basis of a creep drive force set so that a vehicle does not slip down when being stopped on a gradient road, and a braking force calculator configured to calculate a braking force generated on the basis of a braking operation of a driver. The drive source controller reduces a drive force generated by the drive source when the braking force is larger than the creep drive force when the vehicle is stopped. The creep drive force is a force not smaller than a force balanced with a force acting in a slip-down direction of the vehicle at a minimum gradient at which a hill hold function is activated.

3 Claims, 2 Drawing Sheets

(51) Int. Cl.
*B60L 7/26* (2006.01)
*B60L 11/14* (2006.01)

(52) U.S. Cl.
CPC ............... *B60L 7/26* (2013.01); *B60L 11/14* (2013.01); *B60L 15/2045* (2013.01); *B60L 15/2054* (2013.01); *B60L 15/2063* (2013.01); *B60W 10/184* (2013.01); *B60W 30/18118* (2013.01); *B60L 2240/12* (2013.01); *B60L 2240/14* (2013.01); *B60L 2240/485* (2013.01); *B60L 2240/507* (2013.01); *B60L 2250/26* (2013.01); *Y02T 10/6221* (2013.01); *Y02T 10/645* (2013.01); *Y02T 10/70* (2013.01); *Y02T 10/7077* (2013.01); *Y02T 10/7283* (2013.01)

(58) Field of Classification Search
CPC .......... B60L 15/2045; B60L 15/2054; B60L 15/2063; B60L 2240/12; B60L 2240/14; B60L 2240/485; B60L 2240/507; B60L 2250/26; B60W 10/184; B60W 30/18118; Y02T 10/6221; Y02T 10/645; Y02T 10/7275
USPC .......................................................... 701/22
See application file for complete search history.

(56) References Cited

U.S. PATENT DOCUMENTS

| | | | | |
|---|---|---|---|---|
| 6,296,592 B1* | 10/2001 | Eguchi | ............... | B60K 6/48 477/5 |
| 6,338,398 B1* | 1/2002 | Eguchi | ............... | B60K 6/485 137/598 |
| 6,346,064 B1* | 2/2002 | Hada | ............... | B60K 6/543 477/171 |
| 8,954,249 B2* | 2/2015 | Nakatsu | ............... | B60L 3/102 701/69 |
| 2003/0171186 A1* | 9/2003 | Okada | ............... | B60K 31/04 477/71 |
| 2004/0033861 A1* | 2/2004 | Wheeler | ............... | B60W 10/02 477/83 |
| 2004/0215385 A1* | 10/2004 | Aizawa | ............... | B60K 31/00 701/93 |
| 2008/0154472 A1* | 6/2008 | Okuda | ............... | B60K 6/44 701/93 |
| 2010/0168953 A1* | 7/2010 | Mizoguchi | ............... | B60K 23/04 701/31.4 |
| 2012/0022735 A1* | 1/2012 | Tashiro | ............... | B60L 7/18 701/22 |
| 2012/0150384 A1 | 6/2012 | Jung et al. | | |
| 2014/0309828 A1* | 10/2014 | Yamazaki | ............... | B60L 11/123 701/22 |
| 2015/0321675 A1* | 11/2015 | Park | ............... | B60W 10/08 701/53 |

FOREIGN PATENT DOCUMENTS

| | | |
|---|---|---|
| JP | 2010-004705 A | 1/2010 |
| JP | 2010-148250 A | 7/2010 |
| JP | 2013-91466 A | 5/2013 |
| JP | EP 3031661 A1 * | 6/2016 ............... B60K 6/48 |

* cited by examiner

VEHICLE CONTROL DEVICE AND VEHICLE CONTROL METHOD

CROSS-REFERENCE TO RELATED APPLICATIONS

The present application is a national stage application of PCT/JP2014/067847 filed Jul. 3, 2014, and claims priority to Japanese Patent Application No. 2013-162457 filed with Japan Patent Office on Aug. 5, 2013, the entire contents of which are incorporated by reference in their entirety.

BACKGROUND

Technical Field

The present invention relates to a vehicle control device and a vehicle control method.

Related Art

JP2002-142310A discloses a control device for suppressing the generation of an unnecessary creep torque, for example, on a flat road by setting a creep torque on the basis of a gradient of a road surface.

SUMMARY OF INVENTION

In the above control device, the gradient of the road surface is calculated on the basis of a drive force of a vehicle, a vehicle speed and various resistances such as acceleration resistance and travel resistance acting on the vehicle. However, a sensor for detecting the vehicle speed from a moment immediately before the stop of the vehicle to a moment immediately after the stop of the vehicle may not be able to detect an accurate vehicle speed and the gradient of the road surface may not be accurately calculated. Thus, even if a road surface is uphill, the road surface may be erroneously estimated to be flat from a moment immediately before the stop of the vehicle to a moment immediately after the stop of the vehicle, a creep torque may be set excessively small and the vehicle may slip down.

One or more embodiments of the present invention prevents a vehicle from slipping down when the vehicle is stopped on a gradient road such as an uphill road.

A vehicle control device according to one or more embodiments of the present invention includes: a drive source control unit configured to control a drive source on the basis of a creep drive force set so that a vehicle does not slip down when being stopped on a gradient road; and a braking force calculation unit configured to calculate a braking force generated on the basis of a braking operation of a driver. The drive source control unit reduces a drive force generated by the drive source when the braking force is larger than the creep drive force when the vehicle is stopped.

A vehicle control method according to one or more embodiments of the present invention includes: controlling a drive source on the basis of a creep drive force set so that a vehicle does not slip down when being stopped on a gradient road; calculating a braking force generated on the basis of a braking operation of a driver; and reducing a drive force generated by the drive source when the braking force is larger than the creep drive force when the vehicle is stopped.

DETAILED DESCRIPTION

Hereinafter, embodiments of the present invention are described with reference to the accompanying drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
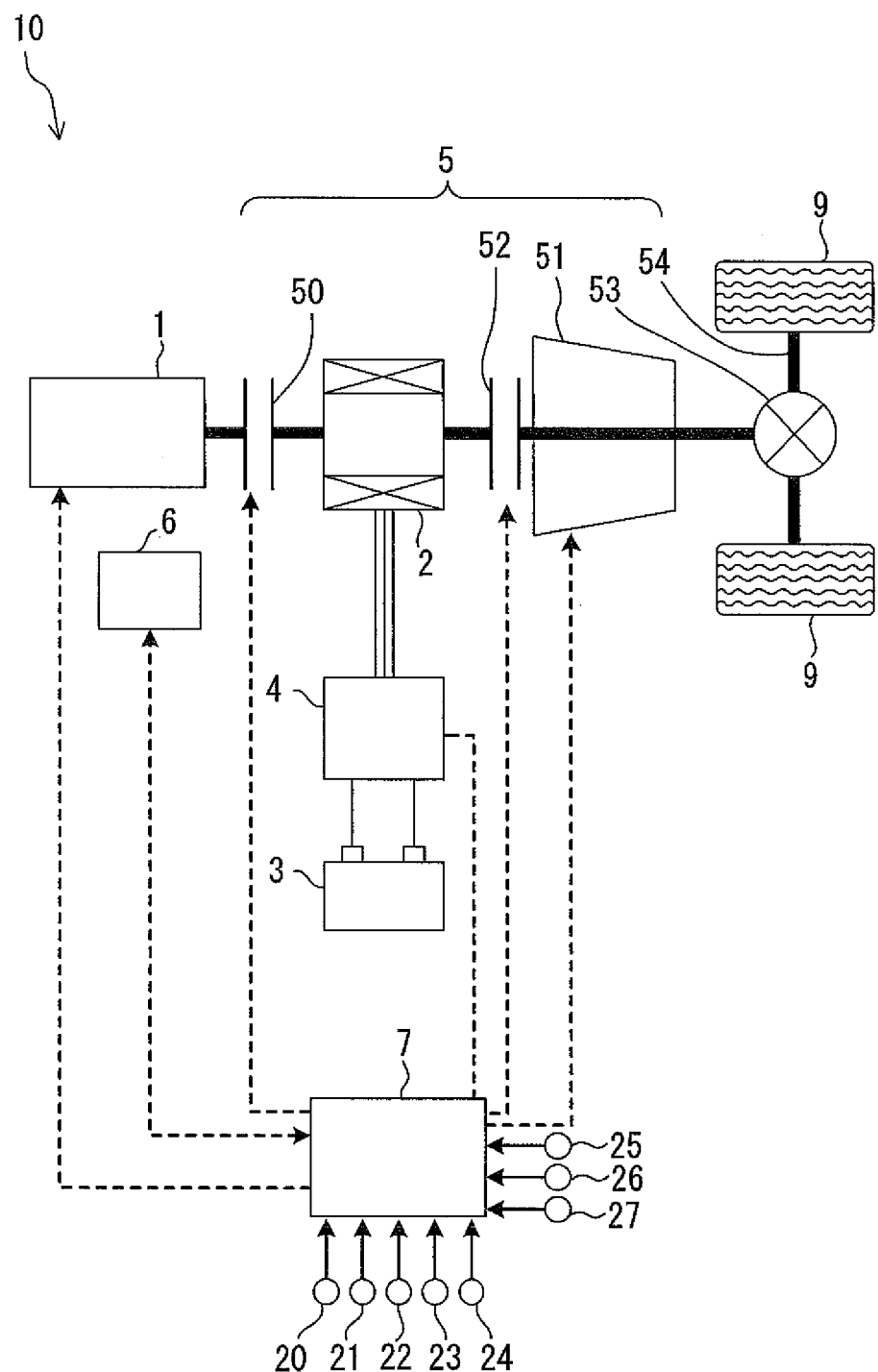
FIG. 1 is a schematic configuration diagram of a vehicle according to one or more embodiments of the present invention.

A vehicle 10 according to one or more embodiments of the present invention is described with reference to FIG. 1. FIG. 1 is a schematic block diagram of the vehicle 10 of the present embodiment.

The vehicle 10 is a hybrid vehicle. The vehicle 10 includes an engine 1 and a motor generator 2 as drive sources, a battery 3 as a power source, an inverter 4 for controlling the motor generator 2 and a drive system 5 for transmitting an output of the drive source to wheels 9. Further, the vehicle 10 includes a controller 7 for controlling the engine 1, the motor generator 2 and the drive system 5.

The motor generator 2 is a synchronous motor generator in which a permanent magnet is embedded in a rotor and a stator coil is wound around a stator. The motor generator 2 has a function as an electric motor which is driven to rotate upon receiving the supply of power and a function as a generator which generates an electromotive force at opposite ends of the stator coil when the rotor is rotated by an external force.

The battery 3 supplies power to various electric components such as the motor generator 2 and accumulates power generated by the motor generator 2.

The inverter 4 is a current converter for converting two types of electricity, i.e. a direct current and an alternating current into each other. The inverter 4 converts a direct current from the battery 3 into a three-phase alternative current of an arbitrary frequency and supplies it to the motor generator 2. On the other hand, when functioning as a generator, the inverter 4 converts a three-phase alternating current from the motor generator 2 into a direct current and supplies it to the battery 3.

The drive system 5 includes a clutch 50, an automatic transmission 51, a forward/reverse switching mechanism 52, a final reduction differential device 53 and drive shafts 54.

The clutch 50 is provided between the engine 1 and the motor generator 2. The clutch 50 is controlled to three states of an engaged state, a slip state (half-clutched state) and a released state.

The automatic transmission 51 is a continuously variable transmission with a primary pulley, a secondary pulley and a belt mounted onthe primary pulley and the secondary pulley. A speed ratio is changed by changing a contact radius of the belt and each pulley.

The forward/reverse switching mechanism 52 includes a planetary gear mechanism as a main constituent element, a forward clutch and a reverse brake, engages the forward clutch and releases the reverse brake when the vehicle travels forward, and releases the forward clutch and engages the reverse brake when the vehicle travels backward. The forward clutch and the reverse brake are controlled to three states of an engaged state, a slip state (half-clutched state) and a released state by changing a torque capacity.

The final reduction differential device 53 is an integral assembly of a final reduction gear and a differential device and transmits rotation transmitted from an output shaft of the automatic transmission 51 to the left and right drive shafts 54 after decelerating it. Further, when rotation speeds of the left and right drive shafts 54 need to be different such as when the vehicle travels on a curve, the final reduction differential device 53 enables smooth traveling by automatically giving a speed difference. The wheels 9 are respectively mounted on the tips of the, left and right drive shafts 54.

A braking force is generated at the wheels 9 by a friction brake mechanism according to a depressed amount of a brake pedal when the brake pedal is depressed. That is, the friction brake mechanism generates a braking force on the basis of a braking operation of a driver. Further, the friction brake mechanism has a hill start assist function (hill hold function) of generating a braking force so that the vehicle 10 does not slip down without direct regard to the braking operation of the driver when the vehicle is stopped on a gradient road. Specifically, the hill start assist function is activated when the vehicle 10 is stopped on a road surface having a predetermined gradient or larger and holds the braking force by holding a brake hydraulic pressure when the brake pedal is depressed (before the brake pedal is released) until a predetermined hill start assist release condition holds even if the driver releases the brake pedal from a state where the brake pedal is depressed. By having such a function, the slip-down of the vehicle 10 can be suppressed when the vehicle starts on a gradient road. It should be noted that the friction brake mechanism may be provided with a pressure pump on a brake hydraulic circuit and may hold the brake hydraulic pressure after boosting it when activating the hill start assist function.

The controller 7 is configured by a microcomputer with a central processing unit (CPU), a read-only memory (ROM), a random access memory (RAM) and an input/output interface (I/O interface).

The controller 7 is inputted a signal from an accelerator pedal sensor 20 for detecting a depressed amount of an accelerator pedal, a signal from a vehicle speed sensor 21 for detecting a vehicle speed, a signal from a brake hydraulic pressure sensor 22 for detecting a brake hydraulic pressure (fluid pressure), a signal from a steering sensor 23 for detecting whether or not a steering ring has been operated, a signal from a turn signal switch 24, a signal from an G sensor 25, a signal from an oil temperature sensor 26 for detecting an oil temperature of the automatic transmission 51, a signal from an inhibiter, switch 27 for detecting the position of a shift lever and other signals. The controller 7 controls the engine 1, the motor generator 2, the clutch 50, the forward/reverse switching mechanism 52 and the automatic transmission 51 on the basis of the input signals.

The controller 7 causes the motor generator 2 to generate a predetermined creep drive force to enable creep traveling during low speed vehicle travel even if the accelerator pedal is completely closed without being depressed while an EV mode is selected. When the brake pedal is depressed by the driver to stop the vehicle 10, this creep drive force can be gradually reduced.

If the creep drive force is reduced at the same timing as on a flat road when a road surface on which the vehicle 10 is stopped is, for example, uphill, the vehicle 10 may slip down backward. Thus, conventionally, a gradient of a road surface has been detected using the G sensor 25 or the like and a creep drive force has been adjusted in consideration of the gradient of the road surface.

However, the values of these sensors 21, 25 fluctuate in association with a swinging movement of the vehicle 10 in a pitch direction from a moment immediately before the vehicle 10 stop to a movement immediately after the vehicle 10 stops. Thus, the detected values may not be accurate and, for example, the road surface may be erroneously estimated to be flat although being uphill. If the gradient of the road surface is detected to be excessively small due to erroneous estimation, the creep drive force is reduced and the vehicle 10 may slip down. Further, if the gradient of the road surface is not detected until the swinging movement converges, a creep drive force of such a magnitude that the vehicle 10 does not slip down on an uphill road is generated by the motor generator 2 until the swinging movement converges, for example, although the vehicle is stopped on a flat road and the creep drive force can be reduced. Thus, electric mileage cannot be improved.

Accordingly, a drive force control described below is executed.

Figure 2:
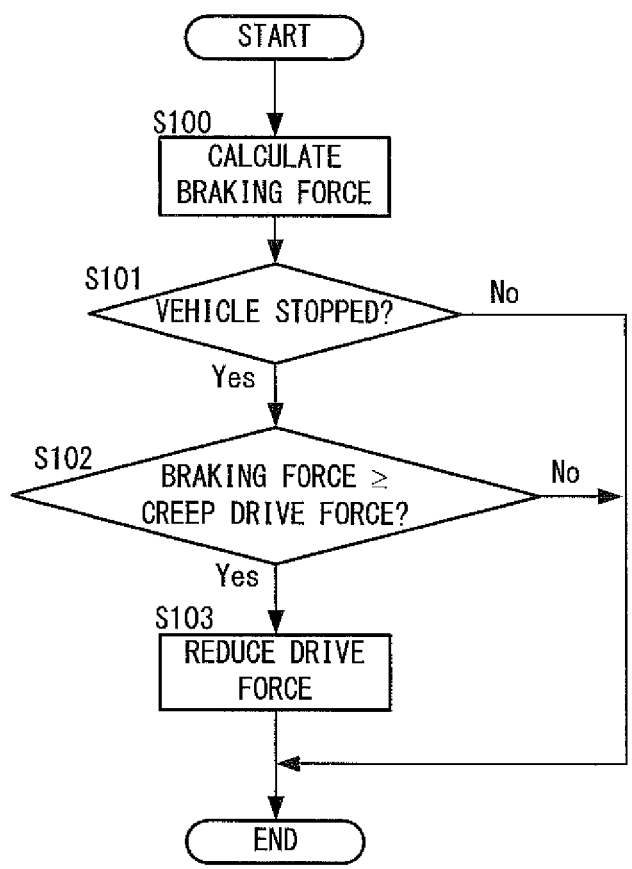
FIG. 2 is a flow chart showing a drive force control according to one or more embodiments of the present invention.

The drive force control according to one or more embodiments of the present invention is described using a flow chart of FIG. 2. Here, the accelerator pedal is not depressed and the controller 7 causes the motor generator 2 to generate a predetermined creep drive force for the creep traveling of the vehicle 10.

In Step S100, the controller 7 calculates a braking force to be generated and applied to the vehicle 10 on the basis of the braking operation of the driver. Specifically, the braking force is calculated on the basis of the hydraulic pressure detected by the brake hydraulic pressure sensor 22.

In Step S101, the controller 7 determines whether or not the vehicle 10 is stopped on the basis of the vehicle speed detected by the vehicle speed sensor 21. If the vehicle 10 is determined to be stopped, a process proceeds to Step S102, whereas the process this time is finished when the vehicle 10 is determined to be traveling.

In Step S102, the controller 7 compares the braking force generated by the braking operation of the driver and the creep drive force. The creep drive force is a force balanced with a force acting in a slip-down direction of the vehicle 10 at a predetermined gradient (minimum gradient) at which the hill start assist function is activated. It should be noted that the creep drive force has only to be not smaller than this balancing force. The process proceeds to Step S103 if the braking force is not smaller than the creep drive force, whereas the process this time is finished if the braking force is smaller than the creep drive force.

In Step S130, the controller 7 reduces the creep drive force generated by the motor generator 2. It should be noted that the creep drive force generated by the motor generator 2 is reduced to zero here. In this way, the electric mileage of the motor generator 2 can be improved.

If the braking force is determined to be not smaller than the creep drive force in Step S102, (a) the vehicle 10 does not slip down due to the braking force generated by the braking operation of the driver even if there is no drive force generated by the motor generator 2 when the gradient of the road surface is smaller than a predetermined gradient. Further, (b) when the gradient of the road surface is not smaller than the predetermined gradient, the hill start assist function is activated, wherefore the vehicle 10 does not slip down. That is, when the braking force is not smaller than the creep drive force, the vehicle 10 does not slip down even if no drive force is generated by the motor generator 2. Accordingly, in Step S103, the controller 7 reduces the drive force generated by the motor generator 2.

It should be noted that the controller 7 may reduce the drive force generated by the motor generator 2 when the brake force is determined to be smaller than the creep drive force in Step S102, the gradient of the road surface is detected after a timing at which the gradient of the road surface can be accurately detected elapses, the gradient of the road surface is not smaller than the minimum gradient at which the hill start assist function is activated and the timing at which the hill start assist function is activated elapses. In this way, the electric mileage of the motor generator 2 can be improved.

When the braking force generated on the basis of the braking operation of the driver and the creep drive force set so that the vehicle 10 does not slip down when stopping on a gradient road are compared and the braking force is larger than the creep drive force, the drive force generated by the motor generator 2 is reduced. As just described, the drive force generated by the motor generator 2 is reduced when such a braking force that the vehicle 10 does not slip down is generated. Thus, even when stopping on a gradient road, the vehicle 10 can be prevented from slipping down. Further, the electric mileage of the motor generator 2 can be improved by reducing the drive force generated by the motor generator 2.

By setting the creep drive force to be balanced with a force acting in the slip-down direction of the vehicle 10 at the predetermined gradient (minimum gradient) at which the hill start assist function is activated, a prevention of the slip-down of the vehicle 10 can be compensated even on a gradient road on which the hill start assist function is not activated. As just described, in one or more embodiments of the present invention, the vehicle 10 can be prevented from slipping down due to the gradient of the road surface even if the creep drive force is reduced.

Although embodiments of the present invention have been described above, the above embodiments are merely examples, and do not limit the technical scope of the present invention to the specific configuration of the above embodiments.

Although one or more of the above embodiments is described using the hybrid vehicle 10, the invention may be used for an electric vehicle or the vehicle 10 equipped only with the engine 1. By executing a control similar to the above drive force control when a drive force is generated by the engine 1 in stopping the vehicle 10, the slip-down of the vehicle 10 can be prevented and the fuel economy of the engine 1 can be improved.

Further, the above drive force control may not be executed when the drive force is necessary due to the operation of the driver such as when the accelerator pedal is depressed, when the steering ring is operated or when the turn signal switch 24 is operated, and when the controllability of the automatic transmission 51 is possibly deteriorated due to an increase or reduction of the oil temperature of the automatic transmission 51.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A vehicle control device, comprising:
   a drive source controller configured to control a drive source on the basis of a creep drive force set so that a vehicle does not slip down when being stopped on a gradient road; and
   a braking force calculator configured to calculate a braking force generated on the basis of a braking operation of a driver,
   wherein the drive source controller reduces a drive force generated by the drive source when the braking force is larger than the creep drive force when the vehicle is stopped, and
   wherein the creep drive force is a force not smaller than a force balanced with a force acting in a slip-down direction of the vehicle at a minimum gradient at which a hill hold function is activated.

2. A vehicle control method, comprising:
   controlling a drive source on the basis of a creep drive force set so that a vehicle does not slip down when being stopped on a gradient road;
   calculating a braking force generated on the basis of a braking operation of a driver; and
   reducing a drive force generated by the drive source when the braking force is larger than the creep drive force when the vehicle is stopped,
   wherein the creep drive force is a force not smaller than a force balanced with a force acting in a slip-down direction of the vehicle at a minimum gradient at which a hill hold function is activated.

3. A vehicle control device, comprising:
   drive source control means configured to control a drive source on the basis of a creep drive force set so that a vehicle does not slip down when being stopped on a gradient road; and
   braking force calculation means configured to calculate a braking force generated on the basis of a braking operation of a driver,
   wherein the drive source control means reduces a drive force generated by the drive source when the braking force is larger than the creep drive force when the vehicle is stopped, and
   wherein the creep drive force is a force not smaller than a force balanced with a force acting in a slip-down direction of the vehicle at a minimum gradient at which a hill hold function is activated.

* * * * *